US008990043B1

(12) United States Patent
Kolodziej (10) Patent No.: US 8,990,043 B1
(45) Date of Patent: Mar. 24, 2015

(54) DETERMINING BUILDING FLOOR LEVEL OF WIRELESS MOBILE COMMUNICATION DEVICE

(75) Inventor: Kris Kolodziej, Asbury, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 547 days.

(21) Appl. No.: 13/038,108

(22) Filed: Mar. 1, 2011

(51) Int. Cl.
*G01C 21/00* (2006.01)

(52) U.S. Cl.
USPC ........................................ 702/150; 455/404.2

(58) Field of Classification Search
USPC ........................................ 702/150; 455/404.2
See application file for complete search history.

(56) References Cited

U.S. PATENT DOCUMENTS

| 5,652,592 | A | 7/1997 | Sanderford et al. |
| 6,518,918 | B1 | 2/2003 | Vannucci et al. |
| 7,937,067 | B2 | 5/2011 | Maier et al. |
| 2006/0019679 | A1 | 1/2006 | Rappaport et al. |
| 2006/0194588 | A1 | 8/2006 | Zhao |
| 2007/0133487 | A1 * | 6/2007 | Wang et al. .................... 370/338 |
| 2007/0168124 | A1 * | 7/2007 | Dossas et al. .................. 701/213 |
| 2008/0042840 | A1 * | 2/2008 | Christopher ................ 340/572.1 |
| 2009/0043504 | A1 | 2/2009 | Bandyopadhyay et al. |
| 2009/0131012 | A1 * | 5/2009 | Ashley et al. ............... 455/404.2 |
| 2009/0280827 | A1 | 11/2009 | Michaud |
| 2010/0178934 | A1 * | 7/2010 | Moeglein et al. ........... 455/456.1 |

\* cited by examiner

*Primary Examiner* — Manuel L Barbee (57) ABSTRACT

A floor-reporting computer system may determine the specific floor in a building on which a wireless mobile communication device is located. A network interface may receive device location information from a network communication system which originated from the wireless mobile communication device and which is indicative of the horizontal and vertical location of the wireless mobile communication device. A computer processing system may receive the device location information from the network interface and determine floor location information indicative of the specific floor in the building on which the wireless mobile communication device is located based on the device location information. The computer processing system may consult one or more databases when determining the floor location information, such as a building location database, a ground elevation database, a building floor height database, and/or an atmospheric air pressure database.

14 Claims, 3 Drawing Sheets

DETERMINING BUILDING FLOOR LEVEL OF WIRELESS MOBILE COMMUNICATION DEVICE

BACKGROUND

1. Technical Field

This disclosure relates to systems and processes which need to know the location of wireless mobile communication devices, such as computer systems which provide location-based services and/or computer systems which provide responses to emergencies.

2. Description of Related Art

Various systems and services may need to know the location of wireless mobile communication devices, such as a cell phones.

For example, a broad variety of location-based services may be provided to users of wireless mobile communication devices. To obtain these services, the wireless mobile communication device may provide information indicative of the location of the wireless mobile communication device. In turn, the location based service may provide information about products, businesses, and services within the vicinity of the wireless mobile communication device.

Another example is emergency response services, such as the emergency response services provided by police departments, fire departments, and/or 911. Knowing the location of the wireless mobile communication device may be critical in determining which emergency service provider should be contacted and in rendering emergency service.

Unfortunately, systems which determine the location of wireless mobile communication devices may focus only on the horizontal location of the device. This can create uncertainties and ambiguities when the wireless mobile communication device is located on a particular floor of a multi-floor building. Even knowledge of the elevation of the wireless mobile communication device may not be sufficient to enable the location of the wireless mobile communication device within the multi-floor building to be determined.

SUMMARY

A floor-reporting computer system may determine the specific floor in a building on which a wireless mobile communication device is located. A network interface may receive device location information from a network communication system which originated from the wireless mobile communication device and which is indicative of the horizontal and vertical location of the wireless mobile communication device. A computer processing system may receive the device location information from the network interface and determine floor location information indicative of the specific floor in the building on which the wireless mobile communication device is located based on the device location information.

The floor reporting computer system may include a building location database containing building location information indicative of the horizontal location of multiple buildings. The computer processing system may determine the floor location information based in part by querying the building location database for the identity of the building at the horizontal location of the wireless mobile communication device.

The device location information which is indicative of the horizontal location of the wireless mobile communication device may be determined by any means, such as a GPS receiver in the wireless mobile communication device and/or by signal triangulation, WiFi geo-location, and/or RF fingerprinting at the wireless mobile communication device.

The device location information which is indicative of the vertical location of the wireless mobile communication device may include atmospheric air pressure information indicative of the atmospheric air pressure at the location of the wireless mobile communication device. The floor reporting computer system may include an atmospheric air pressure database containing atmospheric air pressure information indicative of the atmospheric air pressure at different elevations. The computer processing system may determine the floor location information based in part by querying the atmospheric air pressure database for the elevation of the wireless mobile communication device based on the atmospheric air pressure information.

The device location information which is indicative of the vertical location of the wireless mobile communication device may be determined by any other means, such as by a GPS receiver in the wireless mobile communication device; by signal triangulation, WiFi geo-location, and/or RF fingerprinting at the wireless mobile communication device; and/or by feedback obtained by the wireless mobile communication device from an RFID tag located within the building. The feedback may be indicative of the floor in the building on which the RFID tag is located.

The floor-reporting computing system may include a ground elevation database containing ground elevation information indicative of the elevation of land at various horizontal locations. The ground elevation database may include a digital elevation model, also known as a digital terrain model. The computer processing system may determine the floor location information based in part by querying the ground elevation database for the elevation of the ground below the wireless mobile communication device based on the device location information which is indicative of the horizontal location of the wireless mobile communication device.

The floor-reporting computing system may include a building floor height database containing floor height information indicative of the height of floors in various buildings. The computer processing system may determine the floor location information based in part by querying the building floor height database for the floor height information relating to the building in which the wireless mobile communication device is located. The building floor height database may be derived from public records.

The network interface may receive a request for the floor location information from the network communication system and deliver the floor information into the network communication system. The computer processing systems may deliver the floor location information to the network interface for delivery into the network communication system in response to the request for the floor information.

The floor-reporting computer system may be part of a location-based computer system which provides location-based services and/or part of an emergency response computer system which provides emergency response services.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details which may be apparent or unnecessary may be omitted to save space or for a more effective presentation. Some embodiments may be practiced with additional components or steps and/or without all of the components or steps which are described.

Figure 1:
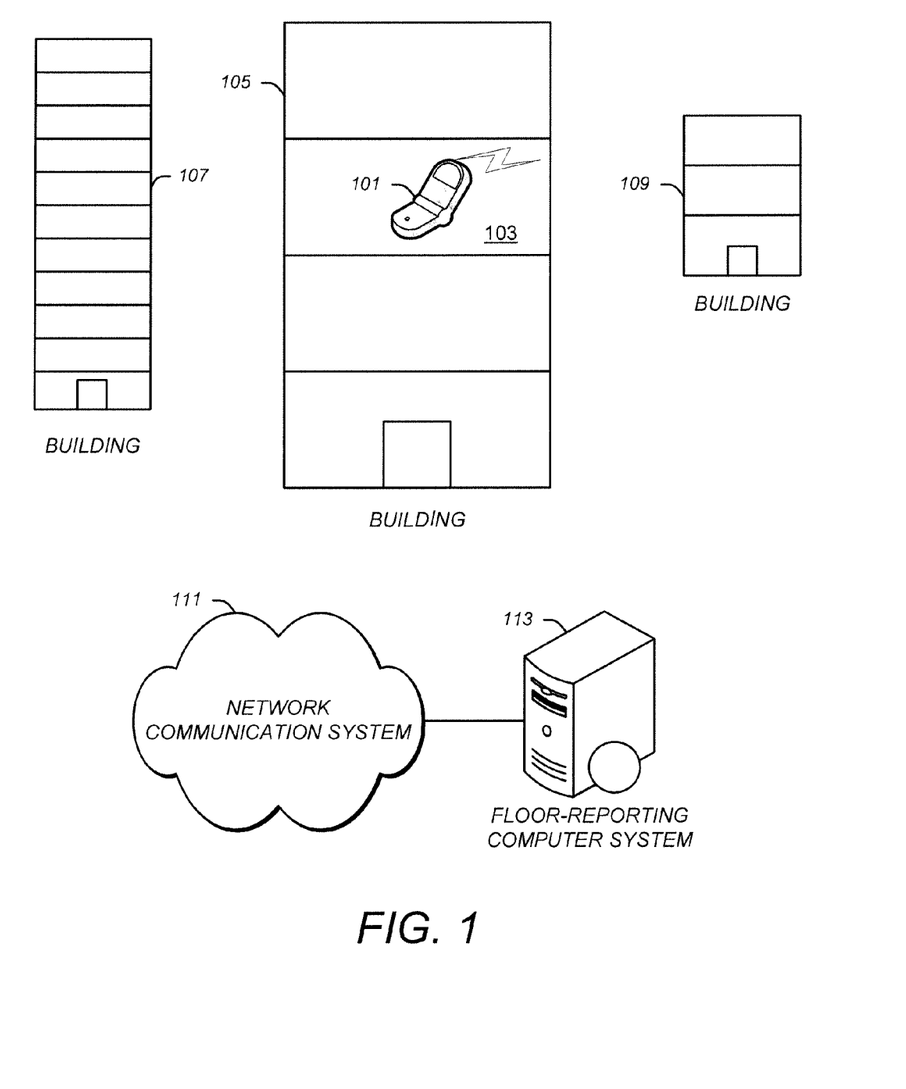
FIG. 1 illustrates an example of various multi-floored buildings, a wireless mobile communication device on an upper floor of one of the buildings, a network communication system, and a floor-reporting computer system.

FIG. 1 illustrates an example of various multi-floored buildings, a wireless mobile communication device on an upper floor of one of the buildings, a network communication system, and a floor-reporting computer system. As illustrated in FIG. 1, a wireless mobile communication device, such as a cell phone 101, may be located on one floor of a building, such as on the third floor 103 of a building 105. Other buildings may be in the vicinity, such as a building 107 and a building 109. As illustrated in FIG. 1, each building may have a different number of floors and a different height for each floor.

As also illustrated in FIG. 1, a network communication system 111 may facilitate communication between wireless mobile communication devices, such as the cell phone 101, and various other devices, such as a floor-reporting computer system 113.

The network communication system 111 may be of any type. For example, the network communication system may consist of or include a cellular communication system, the internet, a local area network, a wide area network, a Wi-Fi communication system, a blue-tooth communication system, or a combination of any of these types of systems. When present, the cellular communication system may be configured to communicate with the wireless mobile communication devices, such as with the cell phone 101. Appropriate gateways may be provided to facilitate communication between different types of systems, such as between a cellular communication system and the internet.

Figure 3:
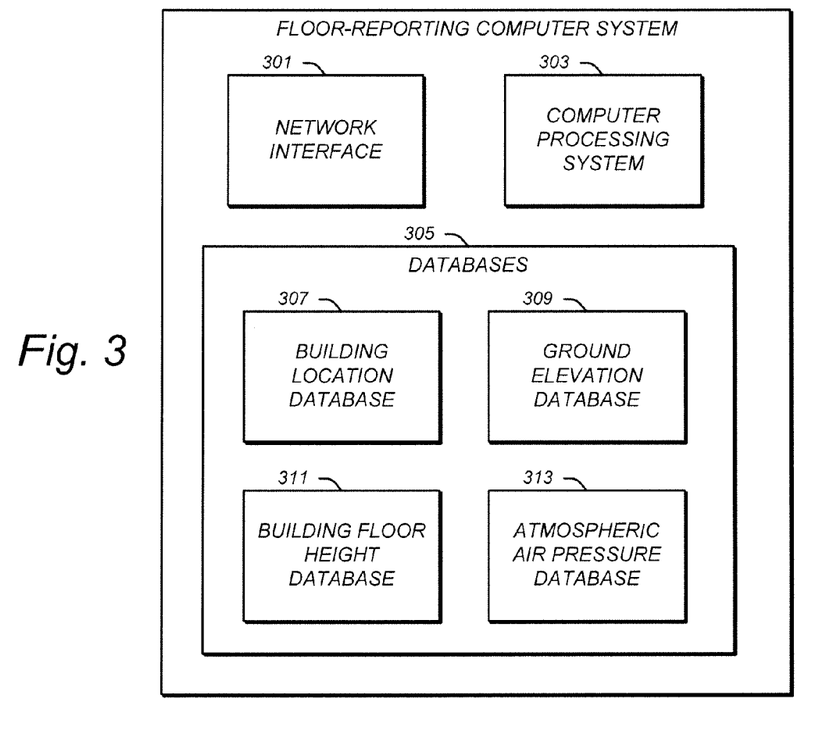
FIG. 3 illustrates an example of the floor-reporting computer system illustrated in FIG. 1.

The floor-reporting computer system 113 may be configured to determine the specific floor in a building on which a mobile communication device is located. An example of the floor-reporting computer system 113 is illustrated in FIG. 3 and is described below in connection with the discussion of this figure.

Figure 2:
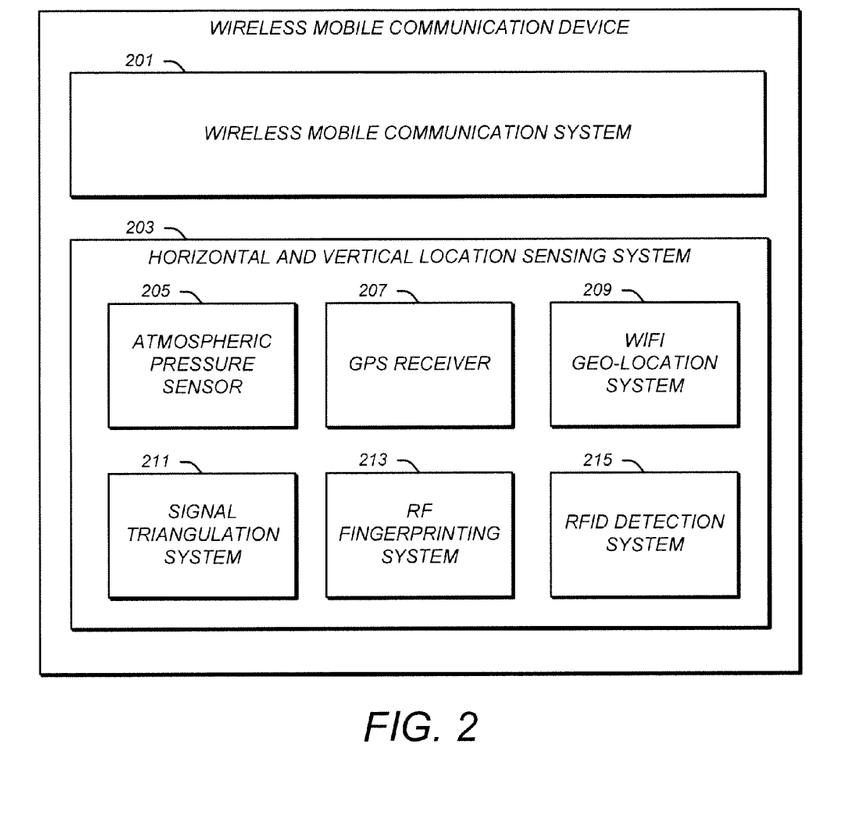
FIG. 2 illustrates an example of the wireless mobile communication device illustrated in FIG. 1.

FIG. 2 illustrates an example of the wireless mobile communication device illustrated in FIG. 1. The wireless mobile communication device illustrated in FIG. 2 may be a different wireless mobile communication device or located in a different building or area. Similarly, the cell phone 101 may be configured differently than is illustrated in FIG. 2.

As illustrated in FIG. 2, the wireless mobile communication device may include a wireless mobile communication system 201 and a horizontal and vertical location sensing system 203.

The wireless mobile communication system 201 may be configured to wirelessly communicate with a network communication system, such as the network communication system 111. The wireless mobile communication system 201 may include a wireless transceiver and a user interface which may include a display, touch screen, keyboard, pointing device, microphone, and/or a sound system. The wireless mobile communication system 201 may include communication, data processing, and/or other types of applications, including applications relating to voice communications, email, instant messaging, text messaging, contact books, calendars, and/or navigation.

The horizontal and vertical location sensing system 203 may be configured to sense the horizontal and vertical location of the wireless mobile communication device. As part of its functionality, the wireless mobile communication system 201 may be configured to provide this horizontal and vertical location information to a remote device, such as to the floor-reporting computer system 113, through a network communication system, such as through the network communication system 111. This may be done in response to a request for the horizontal and vertical location information which is received by the wireless mobile communication system 201, such as a request which is sent by the floor-reporting computer system 113 through the network communication system 111 to the wireless mobile communication device.

The horizontal and vertical location information may be of any type and in any form. For example, it may be the geographic coordinates of the wireless mobile communication device, such as its longitude, latitude, and altitude. The horizontal location information may in addition or instead include a street address. The vertical location information may be with respect to sea level, the ground under the wireless mobile communication device, or with respect to any other reference.

The wireless mobile communication device may contain various types of devices which sense this location information. The device(s) which sense(s) the horizontal location information may be the same as or different than the device(s) which sense(s) the vertical information.

For example, the wireless mobile communication device may include an atmospheric pressure sensor 205. The atmospheric pressure sensor 205 may be configured to sense the pressure of the atmosphere in the vicinity of the wireless mobile communication device. This sensed pressure, in turn, may be indicative of the elevation and hence the vertical location of the wireless mobile communication device. As a general matter, the pressure will be lower at higher elevations. Different weather and even climate conditions within a building may cause variations in pressure at the same elevation and may be taken into consideration and appropriately factored out as a variable. A database may contain information about the effect of weather and building climate changes on the pressure and may be consulted for this purpose.

The wireless mobile communication device may include a GPS receiver 207 which may be configured to sense the horizontal and/or vertical location of the wireless mobile communication device.

Other types of systems may be used in addition or instead to sense the horizontal and/or vertical location of the wireless mobile communication device. For example, a Wi-Fi geo-location system 209 may be configured based on RF fingerprinting to locate a user according to the floor level the WiFi access point is located on. RF Fingerprinting, which is a known technique for location determination, can be used to model a signal map and see the extent and reach of each WiFi Access Point. Furthermore, it can be modeled where a mobile device is based on WiFi signal strength.

The wireless mobile communication device may in addition or instead include a signal triangulation system 211 which may be configured to sense the horizontal and/or vertical location of the wireless mobile communication device by triangulating various signals which are received by the wireless mobile communication device.

The wireless mobile communication device may in addition or instead include an RF fingerprinting system 213 which may be configured to sense the horizontal and/or vertical location of the wireless mobile communication device by matching it to the signal map and the physical location of the base station.

The wireless mobile communication device may in addition or instead include a radio frequency identification device (RFID) detection system 215. This system may be configured to issue a query to a RFID tag which is very near the wireless mobile communication device. RFIDs tag may be positioned throughout the building in which the wireless mobile communication device is located, including on its different floors. These tags may be located anywhere on a floor, such as near an elevator, staircase, fire extinguisher, and/or fire alarm. Each tag may be configured to return a code or other information indicative of the floor on which the tag is located. The tag may in addition or instead return other information, such as the identity of the building and/or its horizontal location. A bar code or other labeling system may be used in addition or instead. This information might be manually accessed and entered by a user in an emergency.

More than one of these location techniques may be used at the same time and the results of all of them may be combined to provide an enhanced degree of accuracy.

FIG. 3 illustrates an example of the floor-reporting computer system illustrated in FIG. 1. The floor-reporting computer system illustrated in FIG. 3 may be used in connection with a different type of system. Similarly, the floor-reporting computer system 113 may be configured differently than is illustrated in FIG. 3.

As illustrated in FIG. 3, the floor-reporting computer system may include a network interface 301, a computer processing system 303, and databases 305.

The network interface may be configured to receive device location information from a network communication system, such as the network communication system 115, which originated from a wireless mobile communication device, such as the cell phone 101. The device location information may be indicative of the horizontal and vertical location of the wireless mobile communication device.

The network interface 301 may be configured to receive a request for floor location information which is indicative of the specific floor in the building on which a mobile communication device is located. The network interface 301 may be configured to receive this request from a network communication system, such as the network communication system 111. The request may originate from any source, such as from a location-based computer system which is configured to provide non-emergency location-based services and/or an emergency response computer system which is configured to provide responses in an emergency. The request for floor location information may in addition or instead be automatically generated from within the mobile communication device.

The network interface 301 may be of any type. For example, the network interface may consist of or include a network interface card or any other device which interfaces a computer system to a network communication system.

The computer processing system 303 may be configured to receive the device location information from the network interface 301. The computer processing system 303 may be configured to determine the floor location information based on the device location information. The processes and computations which are followed may depend upon the nature of the device location information and the content of the databases 305. The computer processing system 303 may be configured to deliver the floor location information to the network interface 301 for delivery into the computer network system in response to the request for the floor information.

The computer processing system 303 may be of any type. For example, the computer processing system may include one or more processors, memory devices (e.g., random access memories (RAMS), read-only memories (ROMS), and/or programmable read-only memories (PROMS)), tangible storage devices (e.g., hard disk drives, CD/DVD drives, and/or flash memories), system buses, video processing components, input/output ports, and/or user interface devices (e.g., keyboards, pointing devices, displays, microphones, sound reproduction systems, and/or touch screens).

The databases 305 may be of any type. The databases 305 may include a building location database 307, a ground elevation database 309, a building floor height database 311, and/or an atmospheric air pressure database 313. The databases may be stored in one or more computer data storage devices, such as one or more random access memories (RAMS) read-only memories (ROMS), programmable read-only memories (PROMS), hard disk drives, CD/DVDs, and/or flash memories.

The building location database 307 may contain building location information indicative of the horizontal location of multiple buildings. Each building may be identified in any way, such as by the name of the building and/or by a code representative of the building. The horizontal location of each building may similarly be expressed in any way. For example, the horizontal location may be expressed as a street address and/or as a longitude or latitude. When a building has a large footprint, a set of horizontal coordinates may be stored which are indicative of the perimeter of that footprint.

The building location database 307 may be derived from any type of information. For example, the building location database 307 may be derived from public records, such as public records relating to building permits, property tax assessments, and/or utility services.

The computer processing system 303 may be configured to determine the floor location information based in part by querying the building location database for the identity of the building at the horizontal location of the wireless mobile communication device. Information about this horizontal location may be part of the device location information which is received by the network interface 301 and which is indicative of the location of the wireless mobile communication device.

For example, the device location information may indicate that the wireless mobile communication device is at a particular longitude and latitude. The computer processing system 303 may query the building location database 307 to determine the identity of any building whose footprint covers that particular longitude and latitude.

The ground elevation database 309 may contain ground elevation information indicative of the elevation of land at various horizontal locations. For example, the ground elevation database 309 may contain information indicative of the elevation of land at particular street addresses and/or geographic coordinates.

The ground elevation database 309 may include a digital elevation model, also known as a digital terrain model. These may include digital representations of the terrain in a particular geographic area, including the elevation of each point on the surface of the terrain. These digital elevation models may be obtained from USGS, Navteq, or other public or private sources.

The computer processing system 303 may be configured to determine the floor location information based in part by querying the ground elevation database 309 for the elevation of the ground below the wireless mobile communication device. The query may be based on the device location information which is indicative of the horizontal location of the wireless mobile communication device. For example, the computer processing system 303 may query the ground elevation database 309 by providing the longitude and latitude of the wireless mobile communication device and, in response, by receiving the elevation of the ground at that geographic coordinate.

The building floor height database 311 may contain floor height information indicative of the height of floors in various buildings. This floor height information may be expressed in any way. For example, it may consist of a single number representative of the height of each floor. When there are differences in these heights, the floor height information may include information indicative of the height of each floor. The floor height information may specify the height of each floor in any way, such as in terms of the distance between the floor and the ceiling immediately above it and/or in terms of the distance between the floor and the ground below.

The floor height information may come from any source. For example, the floor height information may come from one or more public records, such as records relating to building permits and/or safety inspections.

The computer processing system 303 may be configured to determine the floor location information based in part by querying the building floor height database 311. For example, the computer processing system 303 may provide the name and/or street address of the building which it obtained from the building location database 307 as discussed in more detail above. In response, the computer processing system 303 may receive the floor height information from the building floor height database 311.

The atmospheric air pressure database 313 may contain atmospheric air pressure information indicative of the atmospheric air pressure at different elevations. The atmospheric air pressure and each associated elevation may be expressed in any way or in any form. For example, the atmospheric air pressure may be expressed as a force per unit area. The atmospheric air pressure database 313 may or may not take into consideration horizontal location. In other words, the same pressure at different locations may not be indicative of the same elevation.

The computer processing system 303 may be configured to determine the floor location information based in part by querying the atmospheric air pressure database 313. The device location information which is received by the network interface 301 may include atmospheric air pressure information indicative of the atmospheric air pressure at the location of the wireless mobile communication device. The computer processing system 303 may be configured to provide this atmospheric air pressure information to the atmospheric air pressure database 313 for the purpose of obtaining information in response indicative of the elevation of the wireless mobile communication device. The computer processing system 303 may or may not additionally provide the device location information indicative of the horizontal location of the wireless mobile communication device.

The computer processing system 303 may be configured to make some or all of the queries which have been described as part of the process of determining the floor location information. For example, the computer processing system 303 may be configured to query the building location database 307 for the location of the building in which the mobile communication device is located based on the device location information which is received by the network interface 301 and which is indicative of the horizontal location of the wireless mobile communication device. The computer processing system 303 may be configured to next query the building floor height database 311 for the purpose of obtaining the floor height information which is indicative of the height of the floors in the building in which the wireless mobile communication device is located, based on the building which is identified by the query to the building location database 307. The computer processing system 303 may be configured to query the atmospheric air pressure database 313 to obtain the elevation of the wireless mobile communication device based on the atmospheric pressure information which is received by the network interface 301. The computer processing system 303 may query the ground elevation database 309 to determine the elevation of the ground below the wireless mobile communication device based on the device location information which is indicative of the horizontal location of the wireless mobile communication device. The computer processing system 303 may then compute the floor on which the wireless mobile communication device is located. To do so, the computer processing system 303 may subtract the elevation of the ground below the wireless mobile communication device, as reported from the ground elevation database 309, from the elevation of the wireless mobile communication device, as reported by the atmospheric air pressure database 313. The computer processing system may then divide this subtracted result by the height of each floor in the building in which the wireless mobile communication device is located, as reported from the building floor height database 311. The computer processing system 303 may then round off the result to the nearest integer and deem this integer as the specific floor on which the wireless mobile communication device is located.

This computational process may be adjusted depending upon the type of device location information which is provided and the type of information which is contained in the databases 305. For example, if the height of each floor in a building is different, the computer processing system 313 may calculate the distance between the wireless mobile communication device and the ground below it, compare this to a calculated height of each floor, and provide the closest match as the result. When the vertical location in the device location information is provided in the form of an altitude measurement, rather than an atmospheric pressure, for example, the computer processing system 303 may not query the atmospheric air pressure database 313. Indeed, the atmospheric air pressure database 313 may not even exist in such a system.

As indicated above, the floor location information which is determined by the computer processing system 303 and reported by the network interface 301 may be used for any purpose, such as in connection with a system which provides location-based services and/or a system which provides responses to emergencies. In lieu of reporting the floor reporting information to another system in response to a query for this information, the floor-reporting computer system 113 may be part of the other system.

Figure 4:
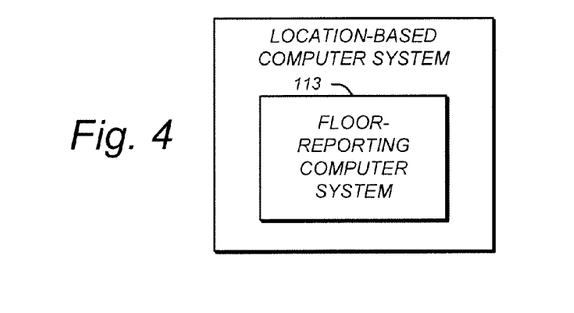
FIG. 4 illustrates an example of a location-based computer system containing the floor-reporting computer system illustrated in FIG. 1.

FIG. 4 illustrates an example of a location-based computer system containing the floor-reporting computer system illustrated in FIG. 1. As illustrated in FIG. 1, the floor-reporting computer system 113 may be part of a location-based computer system. As indicated above, the location-based computer system may provide location-based services, such as information about businesses, events, or activity in the vicinity of the wireless mobile communication device.

Figure 5:
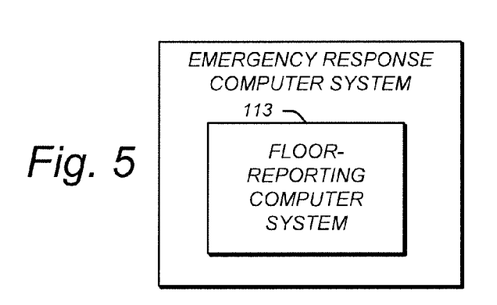
FIG. 5 illustrates an example of an emergency response computer system containing the floor-reporting computer system illustrated in FIG. 1.

FIG. 5 illustrates an example of an emergency response computer system containing the floor-reporting computer system illustrated in FIG. 1. As illustrated in FIG. 5, the floor-reporting computer system 113 may be part of an emergency response computer system. As indicated above, the emergency response computer system may be configured to provide responses to emergency services, such as to cause police, firemen, and/or ambulance personnel to appear at the location of the wireless mobile communication device.

Unless otherwise indicated, the floor-reporting computer system, the location-based computer system, and the emergency response computer system which have been discussed herein may each be implemented with a computer system configured to perform the functions which have been described herein for the component. Each computer system may include one or more computers at the same or different locations. When at different locations, the computers may be configured to communicate with one another through a wired and/or wireless network communication system. Each computer may include one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens). Each computer may include software (e.g., one or more operating systems, device drivers, application programs, and/or communication programs), which may be configured when executed to cause the computer to perform one or more of the functions which have been described herein for the computer system. The software may include programming instructions and associated data and libraries. The software may implement one or more algorithms which may cause the computer to perform each function. The software may be stored on one or more tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, locations, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents. Notwithstanding, none of the claims are intended to embrace subject matter which fails to satisfy the requirement of Sections 101, 102, or 103 of the Patent Act, nor should they be interpreted in such a way. Any unintended embracement of such subject matter is hereby disclaimed.

Except as stated immediately above, nothing which has been stated or illustrated is intended or should be interpreted to cause a dedication of any component, step, feature, object, benefit, advantage, or equivalent to the public, regardless of whether it is or is not recited in the claims.

The invention claimed is:

1. A floor-reporting computer system for determining a specific floor in a building on which a wireless mobile communication device is located, the system comprising: a network interface configured to receive a plurality of device locations from a network communication system which originated from the wireless mobile communication device and which are indicative of the horizontal and vertical locations of the wireless mobile communication device; and
    a computer processing system configured to:
        receive a first device location, and a second device location of the plurality of device locations from the network interface, based on a corresponding first location technique and a second location technique, different from the first location technique, wherein the first and second location techniques are selected from a group of different location techniques consisting of: a GPS receiver in the wireless mobile communication device, signal triangulation at the wireless mobile communication device, WiFi geo-location at the wireless mobile communication device, and RF fingerprinting at the wireless mobile communication device, wherein the first and the second location techniques are used simultaneously, and
        determine floor location information, upon combining the second device location with the first device location to generate a third device location indicative of an enhanced horizontal position and an enhanced vertical position of the wireless communication device;
        wherein the floor location information is indicative of the specific floor in the building on which the wireless mobile communication device is located.

2. The floor-reporting computer system of claim 1, wherein:
    the floor reporting computer system includes a building location database containing building location information indicative of the horizontal location of multiple buildings; and the computer processing system is further configured to determine the floor location information by querying the building location database for the identity of the building at the horizontal location of the wireless mobile communication device.

3. The floor-reporting computer system of claim 2, wherein:
the floor-reporting computing system includes a building floor height database containing floor height information indicative of the height of floors in various buildings; and
the computer processing system is configured to determine the floor location information based in part by querying the building floor height database for the floor height information relating to the building in which the wireless mobile communication device is located.

4. The floor-reporting computer system of claim 3, in which the building floor height database is derived from public records.

5. The floor-reporting computer system of claim 1, wherein:
the device location information which is indicative of the vertical location of the wireless mobile communication device includes atmospheric air pressure information indicative of the atmospheric air pressure at the location of the wireless mobile communication device;
the floor reporting computer system includes an atmospheric air pressure database containing atmospheric air pressure information indicative of the atmospheric air pressure at different elevations; and
the computer processing system is further configured to determine the floor location information based in part by querying the atmospheric air pressure database for the elevation of the wireless mobile communication device based on the atmospheric air pressure information.

6. The floor-reporting computer system of claim 1, wherein the device location information further includes information indicative of the vertical location of the wireless mobile communication device, determined by feedback obtained by the wireless mobile communication device from an RFID tag located with the building.

7. The floor-reporting computer system of claim 6, wherein the feedback is indicative of the floor in the building on which the RFID tag is located.

8. The floor-reporting computer system of claim 1, wherein:
the floor-reporting computing system includes a ground elevation database containing ground elevation information indicative of the elevation of land at various horizontal locations; and
the computer processing system is configured to determine the floor location information based in part by querying the ground elevation database for the elevation of the ground below the wireless mobile communication device based on the device location information which is indicative of the horizontal location of the wireless mobile communication device.

9. The floor-reporting computer system of claim 8, wherein the ground elevation database includes a digital elevation mode.

10. A floor-reporting computer system for determining a specific floor in a building on which a wireless mobile communication device is located, the system comprising:
a network interface configured to receive a plurality of device locations from a network communication system which originated from the wireless mobile communication device and which are indicative of the horizontal and vertical locations of the wireless mobile communication device; and
a building location database containing building location information indicative of the horizontal location of multiple buildings;
a building floor height database containing floor height information indicative of the height of each floor in various buildings;
a ground elevation database containing ground elevation information indicative of the elevation of land at various horizontal locations; and
a computer processing system configured to:
receive a first device location, and a second device location of the plurality of device locations, from the network interface based on a corresponding first location technique and a second location technique, different from the first location technique, wherein the first and second location techniques are selected from a group of different location techniques consisting of: a GPS receiver in the wireless mobile communication device, signal triangulation at the wireless mobile communication device, WiFi geo-location at the wireless mobile communication device and RF fingerprinting at the wireless mobile communication device;
wherein the first and second location techniques are used simultaneously; and
determine floor location information, upon combining the second device location with the first device location to generate a third device location indicative of an enhanced horizontal position and an enhanced vertical position of the wireless communication device;
wherein the floor location information is indicative of the specific floor in the building on which the wireless mobile communication device is located and by further:
querying the building location database for the identity of the building in which the wireless mobile communication device is located based on the horizontal location of the wireless mobile communication device;
querying the building floor height database for floor height information indicative of the height of the floors in the building identified by querying the building location database;
querying the ground elevation database for ground elevation information indicative of the elevation of the ground below the wireless mobile communication device based on the horizontal location of the wireless mobile communication device; and
determining the floor location information based on the enhanced vertical position of the wireless mobile communication device, the floor height information, and the ground elevation information.

11. The floor-reporting computer system of claim 10, wherein:
the information indicative of the vertical location of the wireless mobile communication device includes atmospheric air pressure information indicative of the atmospheric air pressure at the location of the wireless mobile communication device;
the floor reporting computer system includes an atmospheric air pressure database containing atmospheric air pressure information indicative of the atmospheric air pressure at different elevations; and the computer processing system is further configured to determine the floor location information by querying the atmospheric air pressure database for the elevation of the wireless mobile communication device based on the atmospheric air pressure information.

12. The floor-reporting computer system of claim 10, wherein:
the network interface is configured to:
receive a request for the floor location information from the network communication system;
deliver the floor information into the network communication system; and
the computer processing systems is configured to deliver the floor location information to the network interface for delivery into the network communication system in response to the request for the floor information.

13. The floor-reporting computer system of claim 10, wherein the floor-reporting computer system is part of a location-based computer system which provides a location-based service.

14. The floor-reporting computer system of claim 10, wherein the floor-reporting computer system is part of an emergency response computer system which provides an emergency response service.

* * * * *